(12) United States Patent
Kim et al.

(10) Patent No.: US 9,269,937 B2
(45) Date of Patent: Feb. 23, 2016

(54) METHOD FOR PREPARING SEPARATOR FOR BATTERY WITH GEL POLYMER LAYER

(75) Inventors: Je-Young Kim, Daejeon (KR); Pil-Kyu Park, Daejeon (KR); Soon-Ho Ahn, Daejeon (KR); Ki-Chul Hong, Seoul (KR); Oh Young Hyun, Daejeon (KR)

(73) Assignees: LG Chem, Ltd. (KR); Toray Battery Seperator Film Co., Ltd. (JP)

( * ) Notice: Subject to any disclaimer, the term of this patent is extended or adjusted under 35 U.S.C. 154(b) by 797 days.

(21) Appl. No.: 13/530,984

(22) Filed: Jun. 22, 2012

(65) Prior Publication Data

US 2013/0011549 A1  Jan. 10, 2013

Related U.S. Application Data

(63) Continuation-in-part of application No. 12/226,582, filed as application No. PCT/KR2007/002018 on Apr. 25, 2007, now abandoned.

(30) Foreign Application Priority Data

Apr. 28, 2006 (KR) .......................... 10-2006-0038956

(51) Int. Cl.
*H01M 2/14* (2006.01)
*H01M 2/16* (2006.01)

(52) U.S. Cl.
CPC .............. *H01M 2/145* (2013.01); *H01M 2/164* (2013.01); *H01M 2/1653* (2013.01); *H01M 2/1686* (2013.01); *C08J 2205/02* (2013.01)

(58) Field of Classification Search
CPC ... H01M 2/145; H01M 2/164; H01M 2/1653; C08J 2205/02
See application file for complete search history.

(56) References Cited

U.S. PATENT DOCUMENTS

| | | | |
|---|---|---|---|
| 4,153,760 A * | 5/1979 | Sundberg et al. | 429/252 |
| 5,460,904 A | 10/1995 | Gozdz et al. | |
| 5,641,565 A | 6/1997 | Sogo | |
| 5,853,916 A | 12/1998 | Venugopal et al. | |
| 6,656,630 B2 | 12/2003 | Reichert et al. | |
| 7,014,948 B2 | 3/2006 | Lee et al. | |
| 2002/0001753 A1 | 1/2002 | Pekala et al. | |
| 2003/0026932 A1* | 2/2003 | Johnson et al. | 428/40.1 |
| 2004/0053122 A1 | 3/2004 | Sugiyama et al. | |
| 2004/0185335 A1 | 9/2004 | Carlson | |
| 2004/0241550 A1 | 12/2004 | Wensley et al. | |
| 2005/0255769 A1 | 11/2005 | Henninge et al. | |
| 2006/0008700 A1 | 1/2006 | Yong et al. | |
| 2006/0046149 A1 | 3/2006 | Yong et al. | |
| 2007/0072086 A1 | 3/2007 | Nakagawa | |
| 2010/0159314 A1* | 6/2010 | Kim et al. | 429/120 |

FOREIGN PATENT DOCUMENTS

| | | |
|---|---|---|
| JP | 2002-240215 A | 8/2002 |
| JP | 2003-086162 A | 3/2003 |
| JP | 2004-146190 | 5/2004 |
| JP | 2004-277625 A | 10/2004 |
| JP | 2007510266 A | 4/2007 |
| KR | 10-2004-0103425 | 12/2004 |
| WO | 2004/107479 A1 | 12/2004 |

* cited by examiner

*Primary Examiner* — Melissa Rioja
(74) *Attorney, Agent, or Firm* — Lerner, David, Littenberg, Krumholz & Mentlik, LLP

(57) ABSTRACT

Disclosed are a separator for a battery, which comprises a gel polymer layer formed on a substrate, the gel polymer layer including a plurality of three-dimensional open pores interconnected with each other, and an electrochemical device comprising the same separator. Also, disclosed is a method for preparing the gel polymer layer including a plurality of three-dimensional open pores interconnected with each other on a substrate.

10 Claims, 8 Drawing Sheets

FIG. 3
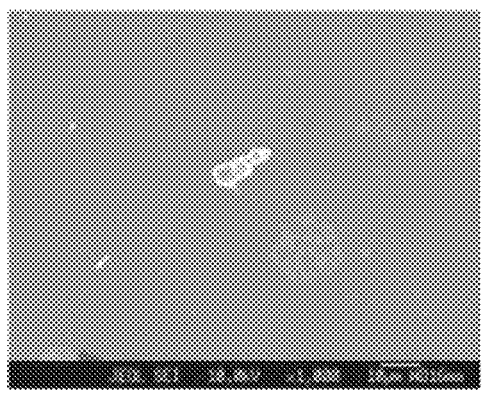
(a) CONVENTIONAL DENSE GEL POLYMER COATING LAYER
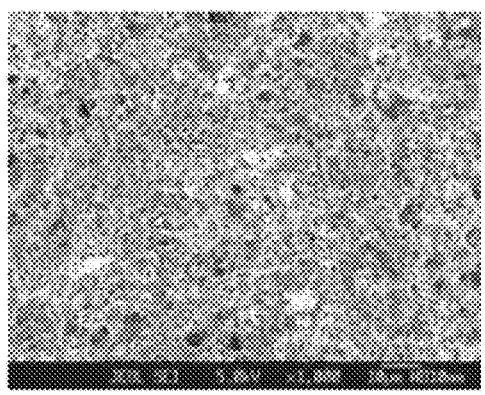
(b) POROUS GEL POLYMER COATING LAYER
FIG. 4
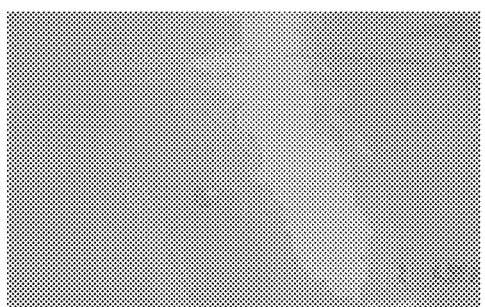
(a) CONVENTIONAL DENSE GEL POLYMER COATING LAYER
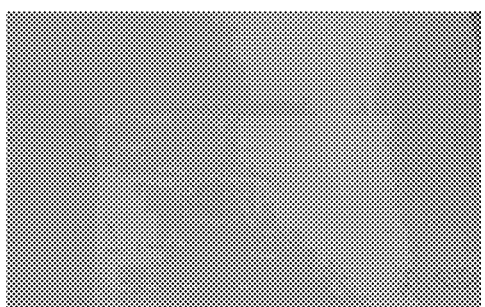
(b) POROUS GEL POLYMER COATING LAYER

METHOD FOR PREPARING SEPARATOR FOR BATTERY WITH GEL POLYMER LAYER

CROSS-REFERENCE TO RELATED APPLICATION(S)

This application is a continuation-in-part of U.S. patent application Ser. No. 12/226,582 filed on May 8, 2009, which is a national phase entry under 35 U.S.C. §371 of International Application No. PCT/KR2007/002018, filed Apr. 25, 2007, published in English, which claims priority under 35 U.S.C. 119(a) to Korean Patent Application No. 10-2006-00038956 filed Apr. 28, 2006, the entire contents of which are incorporated herein by reference.

BACKGROUND

1. Technical Field

The present invention relates to a separator for a battery comprising a gel polymer layer having a three-dimensional open porous structure, a method for preparing the same, and an electrochemical device comprising the same separator.

2. Background Art

Recently, there has been increasing interest in energy storage technology. Batteries have been widely used as energy sources in portable phones, camcorders, notebook computers, PCs and electric cars, resulting in intensive research and development. In this regard, electrochemical devices are subjects of great interest. Particularly, development of rechargeable secondary batteries has been the focus of attention.

Secondary batteries are chemical batteries capable of repeating charge/discharge cycles via reversible conversion between chemical energy and electric energy, and may be classified into Ni-MH secondary batteries and lithium secondary batteries.

A separator serves to prevent an internal short circuit caused by direct contact between a cathode and an anode of a lithium secondary battery and to allow ion penetration. A currently used separator is generally based on polyethylene (also referred to as 'PE' hereinafter) or polypropylene (also referred to as 'PP' hereinafter).

Meanwhile, conventional lithium polymer batteries use a separator on which a dense gel polymer layer is coated. Such a dense gel polymer layer is formed by dissolving a polymer into a solvent to form a coating solution and dipping a polyolefin-based separator into the coating solution.

U.S. Pat. No. 5,460,904 to A. S. Gozdz discloses a hybrid type polyvinylidene fluoride (also referred to as 'PVdF' hereinafter)-based polymer electrolyte. The hybrid type PVdF-based polymer electrolyte is obtained by imparting submicron-sized nanopores to a polymer matrix by using a plasticizer and injecting an organic electrolyte into the pores. However, in this case, an additional step of extracting the plasticizer contained in the polymer matrix is required, and thus the overall process is undesirably complicated. Additionally, if the plasticizer is not completely extracted from the polymer matrix, the remaining plasticizer may cause degradation of the quality of a battery. Moreover, a PVdF-based electrolyte shows poor adhesion to an electrode, although it has a relatively high mechanical strength.

DISCLOSURE

Technical Problem

The inventors of the present invention have found that when a non-solvent is added to a gel polymer solution and the resultant solution is dried under a controlled temperature, the solution undergoes phase separation into a gel polymer-rich phase and a gel polymer-poor phase, so that a plurality of three-dimensional open pores are formed upon the formation of a gel polymer layer, the three-dimensional open pores being interconnected % with each other. The present invention is based on this finding.

Technical Solution

According to an aspect of the present invention, there is provided a separator for a battery, which comprises a gel polymer layer formed on a substrate, the gel polymer layer including a plurality of three-dimensional open pores interconnected with each other.

According to another aspect of the present invention, there is provided a method for preparing a separator for battery with a gel polymer layer including a plurality of three-dimensional open pores interconnected with each other on a substrate, the method comprising the steps of: adding a non-solvent partially to a gel polymer solution containing a gel polymer dissolved in a solvent to allow phase separation of the solution, and applying the phase separated solution onto the substrate; and drying the gel polymer layer.

According to still another aspect of the present invention, there is provided a method for preparing a separator for battery with a gel polymer layer including a plurality of three-dimensional open pores interconnected with each other on a substrate, the method comprising the steps of: applying a gel polymer solution containing a gel polymer dissolved in a solvent onto a substrate, and dipping the substrate into a non-solvent to cause phase separation; and drying the gel polymer layer.

According to still another aspect of the present invention, there is provided a method for preparing a separator for battery with a gel polymer layer including a plurality of three-dimensional open pores interconnected with each other on a substrate, the method comprising the steps of: applying a gel polymer solution containing a gel polymer dissolved in a solvent onto a substrate; and atomizing steam of a non-solvent to the gel polymer layer while drying the gel polymer layer to cause phase separation.

According to yet another aspect of the present invention, there is provided an electrochemical device comprising: (a) a cathode; (b) an anode; (c) a separator comprising a gel polymer layer formed on a substrate, the gel polymer layer including a plurality of three-dimensional open pores interconnected with each other; and (d) an electrolyte.

BRIEF DESCRIPTION OF THE DRAWINGS

FIG. 3 is a photographic view of the dense gel polymer layer (left side) formed in Comparative Example 1 and the gel polymer layer (right side) with an open porous structure formed in Example 1, taken by scanning electron microscopy.

FIG. 4 is a photographic view showing the dense gel polymer layer (left side) formed in Comparative Example 1 and the gel polymer layer (right side) with an open porous structure formed in Example 1, after an electrolyte infiltrates each gel polymer layer.

MODE FOR INVENTION

Hereinafter, the present invention will be explained in more detail.

Figure 2:
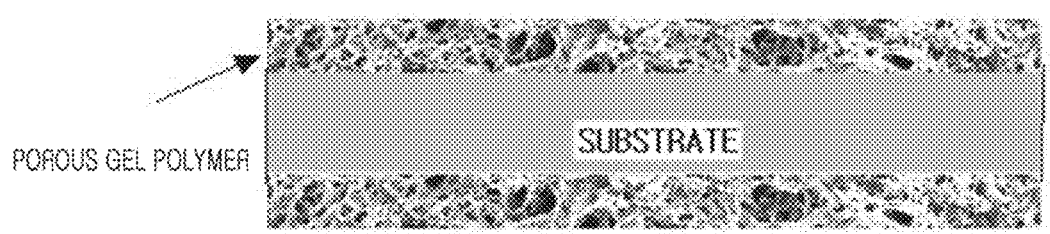
FIG. 2 is a schematic view showing the separator having a gel polymer layer with an open porous structure formed by the phase separation method according to the present invention.
Figure 7:
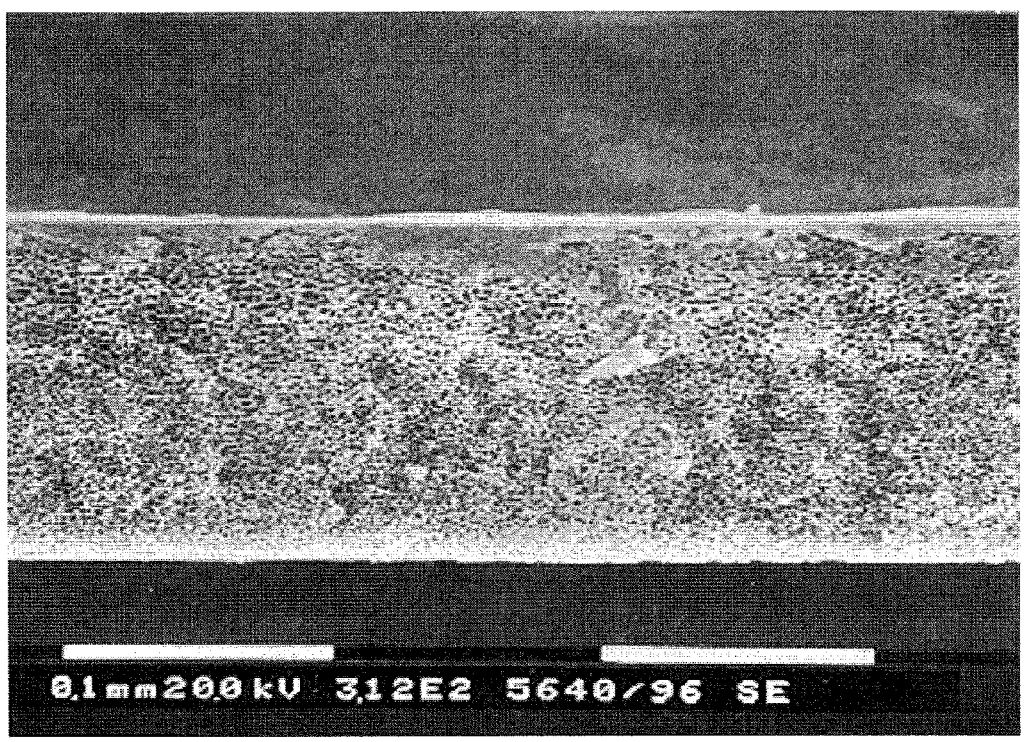
FIG. 7 is a photographic view showing the gel polymer layer having an open porous structure formed by the steam atomization method according to Example 1, taken by scanning electron microscopy.

The separator for a battery according to the present invention is characterized by comprising a gel polymer layer formed on a substrate, wherein three-dimensional open pores are interconnected with each other in the presence of the gel polymer serving as a matrix resin. As shown in FIGS. 2, 3 and 7, the pores are three-dimensionally interconnected with each other to provide an open porous structure.

Figure 1:
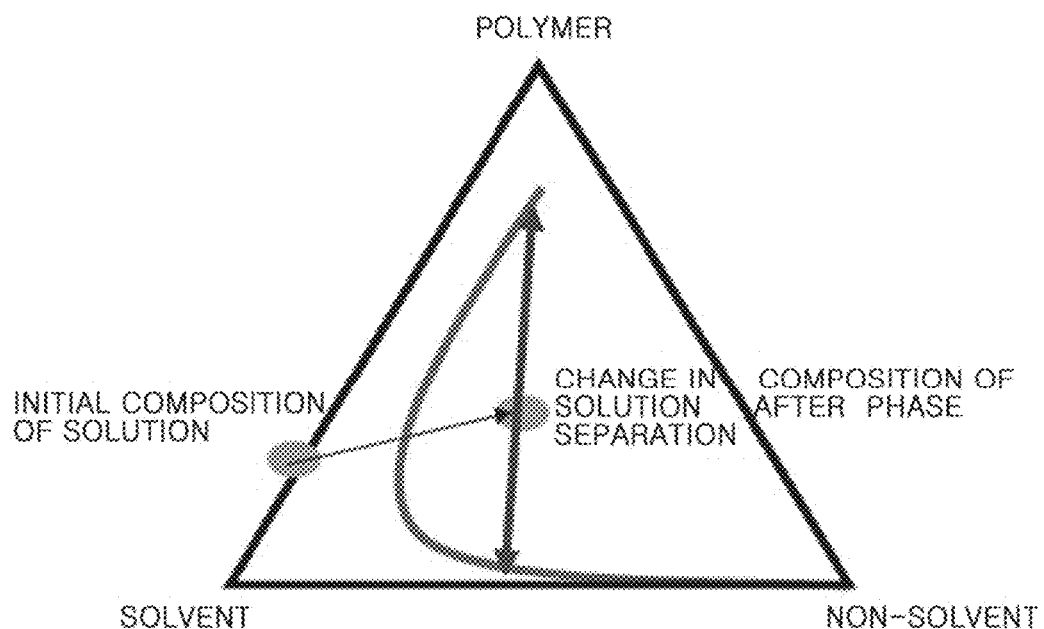
FIG. 1 is a basic ternary system phase diagram of the phase separation method applied to the present invention.

The separator, which comprises a gel polymer layer including a plurality of three-dimensional open pores interconnected with each other on a substrate according to the present invention, can be obtained by adding a non-solvent to a gel polymer solution so that the solvent is partially substituted with the non-solvent, resulting in phase separation into a gel polymer-rich phase and a gel polymer-poor phase (see FIG. 1).

When pores are formed in a gel polymer by using a plasticizer as disclosed in U.S. Pat. No. 5,460,904, the plasticizer forming the pores is disposed in the gel polymer in a non-flowable manner, and thus closed pores are formed. On the contrary, according to the present invention, a gel polymer-rich phase and a gel polymer-poor phase are formed via a solvent/non-solvent phase separation phenomenon, i.e. liquid-liquid phase separation phenomenon. Additionally, the gel polymer-poor phase that is a liquid phase functioning to form pores is flowable, and the liquid phase functioning to form pores can grow due to a surplus Gibbs free energy, thereby providing a gel polymer layer having a three-dimensional open porous structure in which pores are interconnected with each other.

It is possible to allow such solvent/non-solvent phase separation according to the present invention to occur during a step of preparing a gel polymer solution, a step of coating a gel polymer and/or a drying step, so that the gel polymer-poor phase functioning to form pores is formed three-dimensionally and is interconnected with another gel polymer-poor phase.

Thus, according to the present invention, pores have a different structure due to the particular method of coating a gel polymer layer.

The gel polymer may be gelled via the reaction with a subsequently injected electrolyte to form a gel-like polymer electrolyte. As compared to a conventional gel type electrolyte, the electrolyte formed as described above shows an increased space to be filled with a liquid electrolyte by virtue of the interconnected three-dimensional open porous structure, exhibits a high ion conductivity and a high degree of swelling, and thus can improve the quality of a battery.

The first embodiment of the method for preparing a gel polymer layer including a plurality of three-dimensional open pores interconnected with each other on a substrate comprises the steps of adding a non-solvent partially to a gel polymer solution containing a gel polymer dissolved in a solvent to allow phase separation of the solution, and applying the phase separated solution onto the substrate; and drying the gel polymer layer.

The second embodiment of the method for preparing a gel polymer layer including a plurality of three-dimensional open pores interconnected with each other on a substrate comprises the steps of: applying a gel polymer solution containing a gel polymer dissolved in a solvent onto a substrate, and dipping the substrate into a non-solvent to cause phase separation; and drying the gel polymer layer.

The third embodiment of the method for preparing a gel polymer layer including a plurality of three-dimensional open pores interconnected with each other on a substrate comprises the steps of: applying a gel polymer solution containing a gel polymer dissolved in a solvent onto a substrate; and atomizing steam of a non-solvent to the gel polymer layer while drying the gel polymer layer to cause phase separation In the above methods for preparing a gel polymer layer, drying conditions, types and amounts of the solvent and non-solvent, etc. may be controlled to form the three-dimensional open pores.

Meanwhile, the third embodiment using non-solvent steam atomization is more preferred than the first and the second embodiments. In the first embodiment of the method, which comprises the steps of adding a non-solvent partially to a gel polymer solution containing a gel polymer dissolved in a solvent to allow phase separation of the solution and applying the phase separated solution onto the substrate, the gel polymer Solution itself exists in a phase-separated state and shows low long-term stability. Thus, the first embodiment is not amenable to mass production. Additionally, in the second embodiment of the method, which comprises the steps of applying a gel polymer solution containing a gel polymer dissolved in a solvent onto a substrate and dipping the substrate into a non-solvent to cause phase separation, the solvent is mixed with the non-solvent while the phase separation occurs in the dipping step, and thus the non-solvent may undergo a change in composition. Thus, it is difficult to form pores with a uniform shape in the second embodiment of the method. Finally, in the third embodiment of the method using a non-solvent steam atomization process, a gel polymer solution is allowed to be applied onto a substrate in a stable state, and then the non-solvent steam is atomized during the drying step. Therefore, unlike the first and the second embodiments, the third embodiment causes no drop in the stability after the phase separation or causes no change in composition, and thus can provide three-dimensional open pores with a uniform shape.

The first embodiment of the method for preparing a gel polymer layer includes the steps of: adding a non-solvent partially to a gel polymer solution containing a gel polymer dissolved in a solvent to allow phase separation of the solution, and the second embodiment of the method for preparing a gel polymer layer includes the steps of: applying a gel polymer solution containing a gel polymer dissolved in a solvent onto a substrate, and dipping the substrate into a non-solvent to cause phase separation.

That is, in the case of the first embodiment and the second embodiment of the method for preparing a gel polymer layer, since the solvent instantly contacts the non-solvent with an excess amount, the rate of exchange of the solvent and the non-solvent increases.

Meanwhile, in the case of the third embodiment of the method for preparing a gel polymer layer, since the solvent contacts the non-solvent with a small amount through a steam atomization, the rate of exchange of the solvent and the non-solvent can be controlled very slowly.

Figure 8:
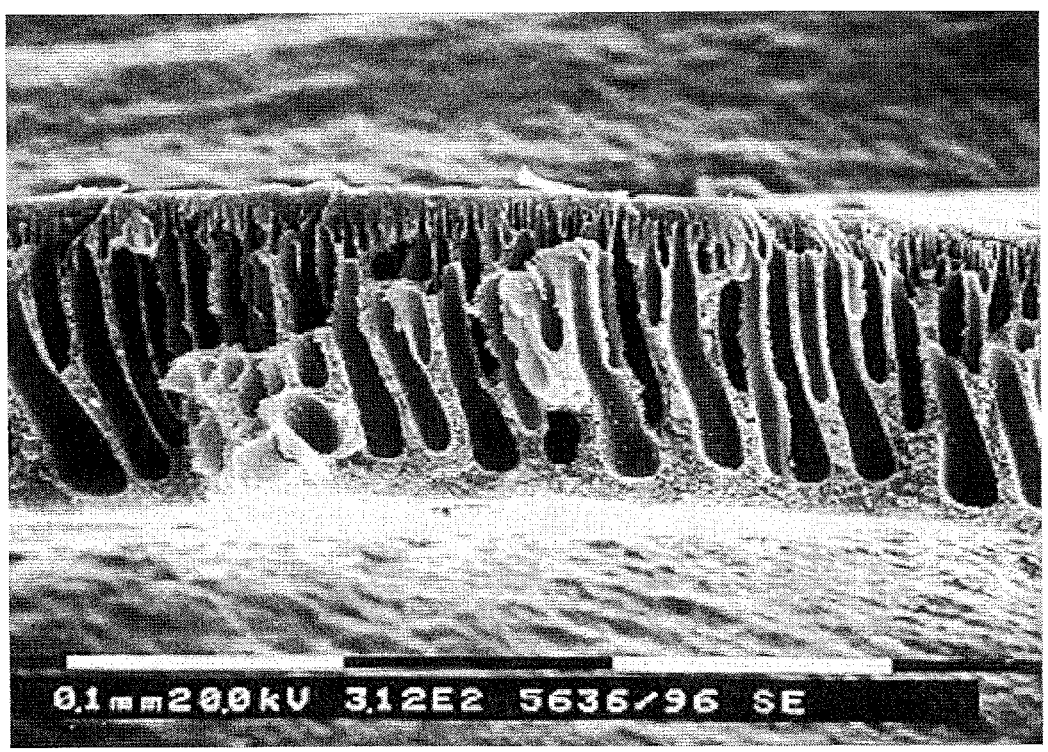
FIG. 8 is a photographic view showing the gel polymer layer having an open porous structure formed by applying a gel polymer solution containing a gel polymer dissolved in a solvent onto a substrate, and dipping the substrate into a non-solvent to cause phase separation, taken by scanning electron microscopy.

Conventionally, as the rate of exchange of the solvent and the non-solvent is slowed down, sponge type pores with uniform diameter sizes are formed in the gel polymer layer (see FIG. 7). However, as the rate of exchange of the solvent and the non-solvent is accelerated, finger type pores with long cross sections and ununiform diameter sizes are formed in the gel polymer layer (see FIG. 8).

As to the differences in the uniformity and shape of the pore in the gel polymer layer, the gel polymer layer with sponge type pores which is formed by using the non-solvent steam atomization, have improved mechanical strength and stability compared with the gel polymer layer formed by using the step of adding a non-solvent partially to a gel polymer solution, or the step of applying a gel polymer solution containing a gel polymer dissolved in a solvent onto a substrate, and dipping the substrate into a non-solvent to cause phase separation. This is because the finger type pores in the gel polymer can be damaged and cracked from the press used in manufacturing a lithium secondary battery.

Preferably, the gel polymer used in the present invention is a polymer having a solubility parameter of $15~45$ $MPa^{1/2}$. If the solubility parameter is less than 15 $MPa^{1/2}$ or greater than 45 $MPa^{1/2}$, the gel polymer shows difficulty in swelling with a conventional liquid electrolyte for a battery. Therefore, hydrophilic polymers having more polar groups as compared to hydrophobic polymers, such as polyolefin, are preferred.

It is preferred that the gel polymer has a low glass transition temperature (Tg), and preferably of $-20~200°$ C. This is because such a low glass transition temperature can contribute to improvement of physical properties, such as flexibility and elasticity, of a finally formed gel polymer layer.

Non-limiting examples of the gel polymer that may be used in the present invention include PVDF, PVDF-like copolymers (e.g. polyvinylidene fluoride-co-hexafluoropropylene (PVDF-co-HFP) or polyvinylidene fluoride-trichloroethylene (PVDF-co-CTFE)), carboxymethyl cellulose (CMC)-based polymers, polyethylene oxide (PEO)-based polymers, polyacrylonitrile (PAN)-based polymers, polymethyl methacrylate (PMMA)-based polymers or combinations thereof.

It is also possible to use polyvinyl pyrrolidone, polyvinyl acetate, polyethylene-co-vinyl acetate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, acrylonitrile-styrene-butadiene copolymer, polyimide, or combinations thereof.

Any material other than the above materials may be used alone or in combination, as long as the material satisfies the afore-mentioned characteristics.

In the present invention, selection of the solvent and the non-solvent is important so as to cause phase separation into a gel polymer-rich phase and a gel polymer-poor phase via the solvent/non-solvent phase separation, and to form three-dimensional pores formed by the gel polymer-poor phases interconnected with each other. Selection of the solvent and the non-solvent depends on the particular type of the gel polymer.

The solvent for dissolving the gel polymer therein preferably has a solubility parameter similar to the solubility parameter of the gel polymer to be used and shows a low boiling point. This is for accomplishing uniform mixing and facilitating the subsequent removal of the solvent.

Non-limiting examples of the solvent that may be used in the present invention include acetone, tetrahydrofuran, methylene chloride, chloroform, dimethyl formamide, N-methyl-2-pyrrolidone, cyclohexane or a mixture thereof.

Meanwhile, non-limiting examples of the non-solvent for the gel polymer include alcohols, such as methyl alcohol, ethyl alcohol, propyl alcohol or butyl alcohol, and water.

Preferably, the substrate onto which the gel polymer layer according to the present invention may be applied is a porous separator. The porous separator may be provided in the form of a membrane or fiber. In the case of a fibrous separator, a non-woven web forming a porous web, such as melt blown web or spunbond web formed of long fibers, is preferred.

Non-limiting examples of the materials foiling the substrate that may be used in the present invention include polyolefin-based materials, polyethylene terephthalate, polybutylene terephthalate, polyester, polyacetal, polyamide, polycarbonate, polyimide, polyetheretherketone, polyethersulfone, polyphenylene oxide, polyphenylenesulfidro, polyethylenenaphthalene or a combination thereof. Also, other heat resistant engineering plastics may be used with no particular limitation.

Although there is no particular limitation in the thickness of the substrate, the substrate has a thickness preferably of $1~100$ μm, and more preferably of $5~50$ μm.

There is no particular limitation in the pore size and porosity of the porous substrate, a porosity of $5~95\%$ being preferred. The pore size preferably ranges from 0.01 to 50 μm, and more preferably ranges from 0.1 to 20 μm.

The gel polymer suitably has a molecular weight of $10,000~1,000,000$. If the gel polymer has an excessively low molecular weight, it is difficult to form a uniform gel polymer layer during the coating step. If the gel polymer has an excessively high molecular weight, the gel polymer has a low solubility to a solvent and a high viscosity, and thus shows poor processability.

The gel polymer is used preferably in a concentration of $0.1~30\%$ to the solvent thereof. If the polymer concentration is too low, it is difficult to form a uniform gel polymer layer. If the polymer concentration is too high, the polymer is hardly soluble in a solvent and has an increased viscosity during the coating step, and thus shows poor processability.

The non-solvent is used preferably in a ratio of $0.1~50$ vol % to the solvent. If the ratio of the non-solvent is too low, no phase separation occurs. If the ratio of the non-solvent is too high, the polymer precipitates, resulting in the formation of a non-uniform gel.

In order to coat the substrate with the gel polymer solution or the gel polymer solution containing a non-solvent, any conventional method known to those skilled in the art may be used. For example, various processes including a dip coating process, die coating process, roll coating process, comma coating process or a combination thereof may be used. Additionally, either surface or both surfaces of the substrate may be coated with the gel polymer solution.

During the drying step, the drying temperature is preferably controlled to a temperature of 50~130° C. so as to form a gel polymer layer including a plurality of interconnected three-dimensional open pores. If the drying temperature is too low, the solvent and/or the non-solvent may remain in the gel polymer layer, and thus may cause a problem in the quality of the battery. If the drying temperature is higher than 130° C., the substrate for the separator is damaged, resulting in degradation of the basic physical properties thereof. The drying step is carried out preferably for 5~250 seconds. If the drying time is too short, the solvent/non-solvent may remain in the gel polymer layer and cause degradation in the quality of the battery. If the drying time is too long, the productivity of the separator decreases.

When pores are formed from the gel polymer-poor phases, it is possible to control the pore size, porosity, pore interconnection aspect, etc. through the selection and proportion of the solvent/non-solvent and the drying temperature/time, etc. To increase the pore size and pore interconnection, it is necessary to reduce the drying temperature and to increase the drying time so that the phase-separated gel polymer-poor phases can sufficiently grow.

The three-dimensional open pores have an average diameter of 0.01~10 μm.

According to a preferred embodiment of the present invention, the separator having the gel polymer layer including interconnected three-dimensional open pores shows an increase in the air permeability of 300% or less. Since the gel polymer layer serves as a resistance layer to the air permeability, a gel polymer layer having a relatively high air permeability requires a longer period of time to allow lithium ion penetration, and thus is not desirable in terms of the quality of a cell.

Then, the pore structure formed from the gel polymer-poor phase is filled with a subsequently injected electrolyte, and the electrolyte serves to conduct ions. Therefore, the pore size and porosity are important factors in controlling the ion conductivity of a separator for a battery.

The gel polymer coating layer according to the present invention suitably has a thickness of 0.1~10 μm. If the coating layer is too thin, it shows low adhesion to an electrode and a low degree of swelling with an electrolyte. If the coating layer is too thick, it serves as a highly resistant layer against lithium ion conduction and causes an increase in the total thickness of a battery, resulting in a drop in the capacity of a battery.

The gel polymer layer according to the present invention may further comprise inorganic particles and other additives.

The separator obtained as described above can be used as a separator for an electrochemical device, and preferably for a lithium secondary battery.

Further, the present invention provides an electrochemical device comprising: (a) a cathode; (b) an anode; (c) the separator, which comprises a gel polymer layer formed on a substrate, the gel polymer layer including a plurality of three-dimensional open pores interconnected with each other; and (d) an electrolyte.

The electrochemical device includes any device in which electrochemical reactions are performed. Particular examples of the electrochemical device include all kinds of primary batteries, secondary batteries, fuel cells, solar cells, capacitors, or the like. Preferably, the electrochemical device is a secondary battery, more preferably a lithium secondary battery, such as a lithium metal secondary battery, a lithium ion secondary battery, a lithium polymer secondary battery or a lithium ion polymer secondary battery.

The electrochemical device may be prepared by using any conventional method known in the art. In one embodiment of the preparation method, the separator as described above is interposed between a cathode and an anode to form an assembly into which the electrolyte solution is then injected.

There is no particular limitation in the electrode that may be used with the separator of the present invention. The electrode may be prepared by bonding electrode active material to the electrode current collector according to any conventional method known in the art. Non-limiting examples of a cathode active material among the electrode active material, include any conventional cathode active material which can be used in a cathode of the conventional electrochemical device. Preferably, a lithium intercalation material such as a lithiated magnesium oxide, a lithiated cobalt oxide, a lithiated nickel oxide or a composite oxide obtained by combinations of the above oxides is used as a cathode active material. Non-limiting examples of a anode active material include any conventional anode active material which can be used in an anode of the conventional electrochemical device. Preferably, a lithium intercalation material such as lithium metal, lithium alloy, carbon, petroleum coke, activated carbon, graphite, or various types of carbons, etc is used as an anode active material. Non-limiting examples of the cathode current collector include a foil made of aluminum, nickel or combinations thereof. Non-limiting examples of the anode current collector include a foil made of copper, gold, nickel or a copper alloy, or combinations thereof.

The electrolyte may contain a salt having the structure of $A^+B^-$, wherein $A^+$ includes alkali metal cations such as $Li^+$, $Na^+$ and $K^+$ or combinations thereof, and $B^-$ includes anions such as $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2^-$ and $C(CF_2SO_2)_3^-$, or combinations thereof, the salt being dissolved or dissociated in an organic solvent such as propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone or mixtures thereof. However, the electrolyte that may be used in the present invention is not limited to the above examples.

More particularly, the electrolyte may be injected in a suitable step during the manufacturing process of an electrochemical device, according to the manufacturing process and desired properties of a final product. In other words, electrolyte may be injected, before an electrochemical device is assembled or in a final step during the assemblage of an electrochemical device.

Processes that may be used for applying the separator of the present invention to a battery include not only a conventional winding process but also a lamination (stacking) and folding process of a separator and electrode.

When applying the separator having a gel polymer layer including a plurality of interconnected three-dimensional open pores on a substrate according to the present invention to a battery, the battery shows an improved degree of swelling with an electrolyte and an increased holding amount and injection amount of electrolyte, and thus can provide improved quality, including cycle characteristics and high rate discharge characteristics.

Particularly, when applying the separator according to the present invention to a stack-type battery, the separator shows increased adhesion strength to an electrode due to the gel polymer having three-dimensional open pores, and thus improves the processability during the manufacture of batteries. Additionally, unlike a separator having no gel polymer coating layer, the separator according to the present invention can apply a vacuum into a cell, so that the cell is inhibited from swelling under high-temperature storage conditions. Further, the adhesion between the separator and the electrode can be performed under a lower temperature and a lower pressure, resulting in improvement in the processability.

Reference will now be made in detail to the preferred embodiments of the present invention. It is to be understood that the following examples are illustrative only and the present invention is not limited thereto.

Example 1

1-1. Preparation of Separator

A polyvinylidene fluoride-co-chlorotrifluoro ethylene (PVdF-CTFE) polymer is added to acetone in an amount of about 5 wt %, and dissolved at a temperature of 50° C. for at least 12 hours to provide a polymer solution. The resultant solution was coated onto a F12BMS porous substrate for a separator (porosity: 50%) with a thickness of about 12 μm, available from Tonen Co., via a dip coating process, wherein the coating layer thickness was controlled to about 2 μm. Then, water as a non-solvent was atomized in the form of steam, while the coating layer was dried at 90° C. for 1 minute so that open pores could be formed on the gel polymer and interconnected with each other.

After measuring the air permeability by using an air permeability measuring system, the substrate comprising the gel polymer layer formed by the above non-solvent steam atomizing process showed an air permeability of about 400-450 seconds

1-2. Manufacture of Lithium Secondary Battery (Manufacture of Cathode)
To N-methyl-2-pyrrolidone (NMP) as a solvent, 92 wt % of $LiCoO_2$ as a cathode active material, 4 wt % of carbon black as a conductive agent and 4 wt % of polyvinylidene fluoride (PVDF) as a binder were added to form mixed slurry for a cathode. The slurry was coated on aluminum (Al) foil having a thickness of about 20 μm as a cathode collector, and then dried to form a cathode. Then, the cathode was subjected to roll press.

(Manufacture of Anode)
To N-methyl-2-pyrrolidone (NMP) as a solvent, 96 wt % of carbon powder as an anode active material, 3 wt % of PVdF (polyvinylidene fluoride) as a binder and 1 wt % of carbon black as a conductive agent were added to form mixed slurry for an anode. The slurry was coated on copper (Cu) foil having a thickness of about 10 μm as an anode collector, and then dried to form an anode. Then, the anode was subjected to roll press.

(Manufacture of Battery)
The cathode, the anode and the separator obtained as described in Example 1-1 were stacked to provide an electrode assembly, and an electrolyte comprising 1M lithium hexafluorophosphate ($LiPF_6$) dissolved in ethylene carbonate/ethylmethyl carbonate (EC/EMC=1:2 on the volume basis) was injected thereto to provide a lithium secondary battery.

Comparative Example 1

A polyvinylidene fluoride-co-chlorotrifluoro ethylene (PVdF-CTFE) polymer is added to acetone in an amount of about 5 wt %, and dissolved at a temperature of 50° C. for at least 12 hours to provide a polymer solution. The resultant solution was coated onto a F12BMS porous substrate for a separator (porosity: 50%) with a thickness of about 12 μm, available from Tonen Co., via a dip coating process, wherein the coating layer thickness was controlled to about 2 μm. At this time, a dense gel polymer layer was formed on the separator. After measuring the air permeability by using an air permeability measuring system, the F12BMS substrate showed an air permeability of about 240-260 seconds, while the substrate, on which the dense gel polymer coating layer was formed, showed an air permeability of 5,000 seconds or more.

A lithium secondary battery was manufactured in the same manner as described in Example 1, except that the separator having the dense gel polymer layer obtained as described in this example was used.

Example 2

A separator having a gel polymer layer and a lithium secondary battery were provided in the same manner as described in Example 1, except that methanol as a non-solvent was added in an amount of 5 vol % based on the volume of acetone. The separator having the gel polymer layer obtained in this example showed an air permeability of about 1,500~1,700 seconds.

Example 3

A separator having a gel polymer layer and a lithium secondary battery were provided in the same manner as described in Example 1, except that methanol as a non-solvent was added in an amount of 15 vol % based on the volume of acetone. The separator having the gel polymer layer obtained in this example showed an air permeability of about 800-900 seconds.

Experimental Example 1

Surface Analysis of Separators

Figure 9:
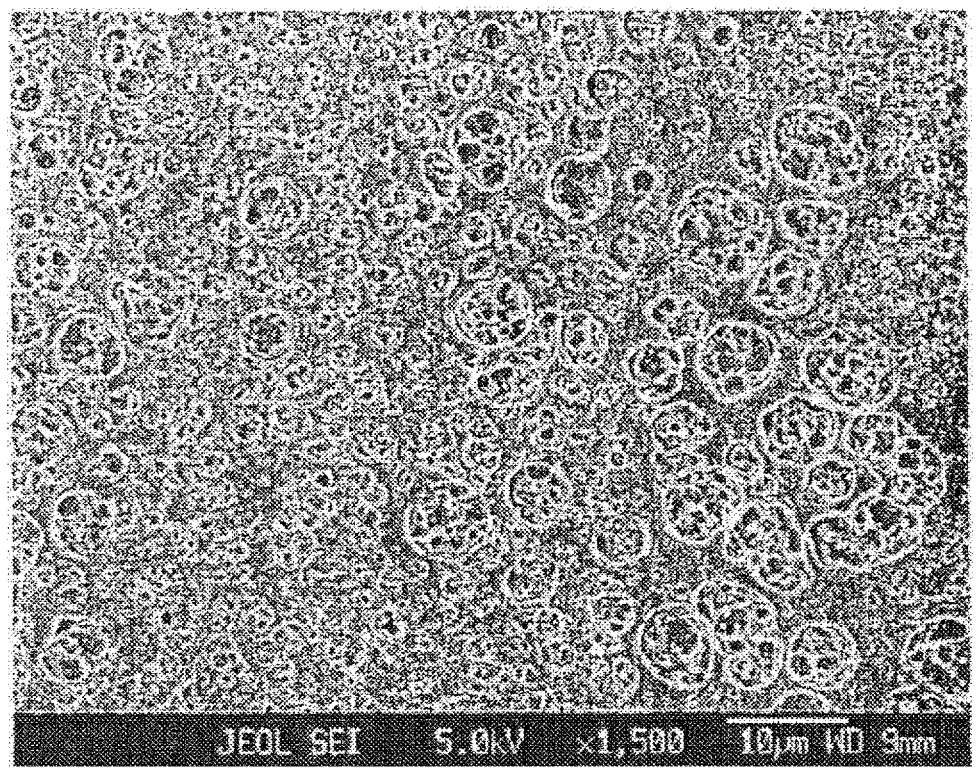
FIG. 9 is a photographic view showing the porous gel polymer layer prepared according to Example 2, taken by scanning electron microscopy.
Figure 10:
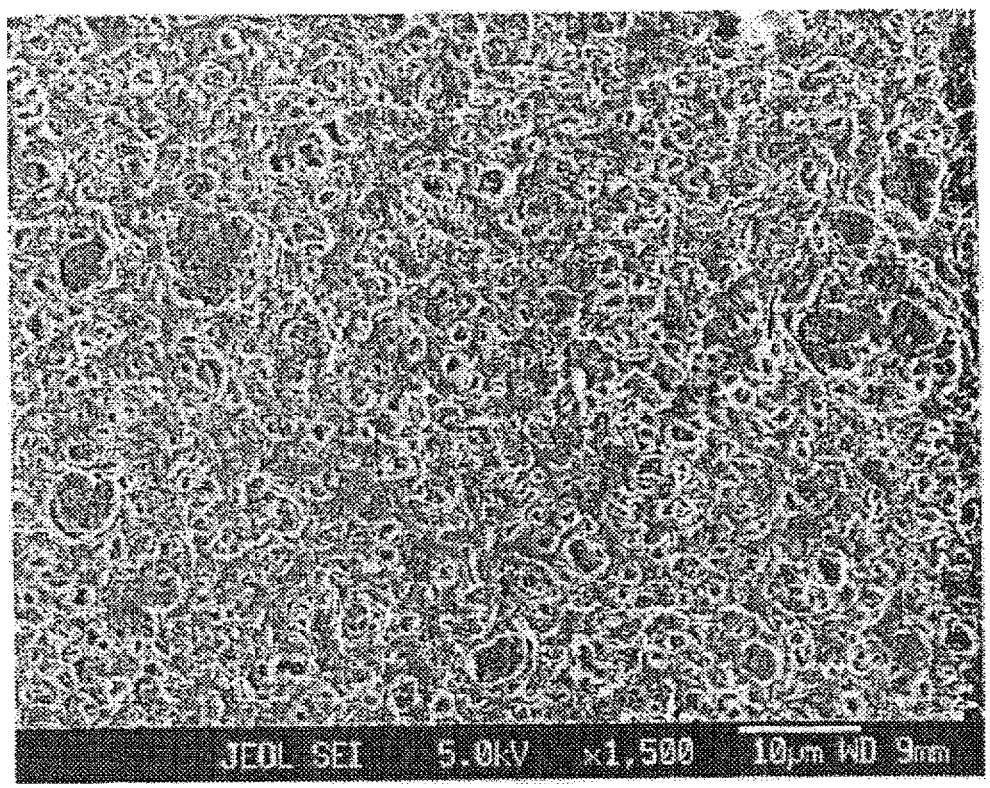
FIG. 10 is a photographic view showing the porous gel polymer layer prepared according to Example 3, taken by scanning electron microscopy.

To perform surface analysis of the separators having the gel polymer layers according to Examples 1, 2, and 3 and Comparative Example 1, scanning electron microscopy was carried but. The separator according to Comparative Example 1 was coated with a dense gel polymer layer and showed no porous structure. However, it could be seen from the inventive separators according to Examples 1 that a gel polymer layer including a plurality of interconnected three-dimensional open pores was formed on a substrate (see FIG. 7). Additionally, it could be seen that when using a different amount of non-solvent (Examples 2 and 3), porosity decreased and air permeability time increased, as the amount of non-solvent decreased (see FIGS. 9 and 10).

Experimental Example 2

Test of Swelling of Separator with Electrolyte

To examine the difference in the swelling degrees of separators depending on surface morphologies, a conventional electrolyte comprising 1M $LiPF_6$ dissolved in EC/EMC (EC: EMC-1:2) was dropped to the surface of each of the separators according to Example 1 and Comparative Example 1 through an injection needle, and the swelling degree of each separator with the electrolyte was observed. As can be seen from FIG. 4, the separator having a dense surface structure according to Comparative Example 1 shows no significant change in the appearance of the electrolyte even after a long period of time. However, in the case of the separator having gel polymer layer with a three-dimensional open porous structure according to Example 1, the electrolyte disperses onto the whole surface thereof in 30 seconds, and thus the separator shows a significantly increased swelling degree with the electrolyte.

Experimental Example 3

Evaluation of Quality of Lithium Secondary Battery

Figure 5:
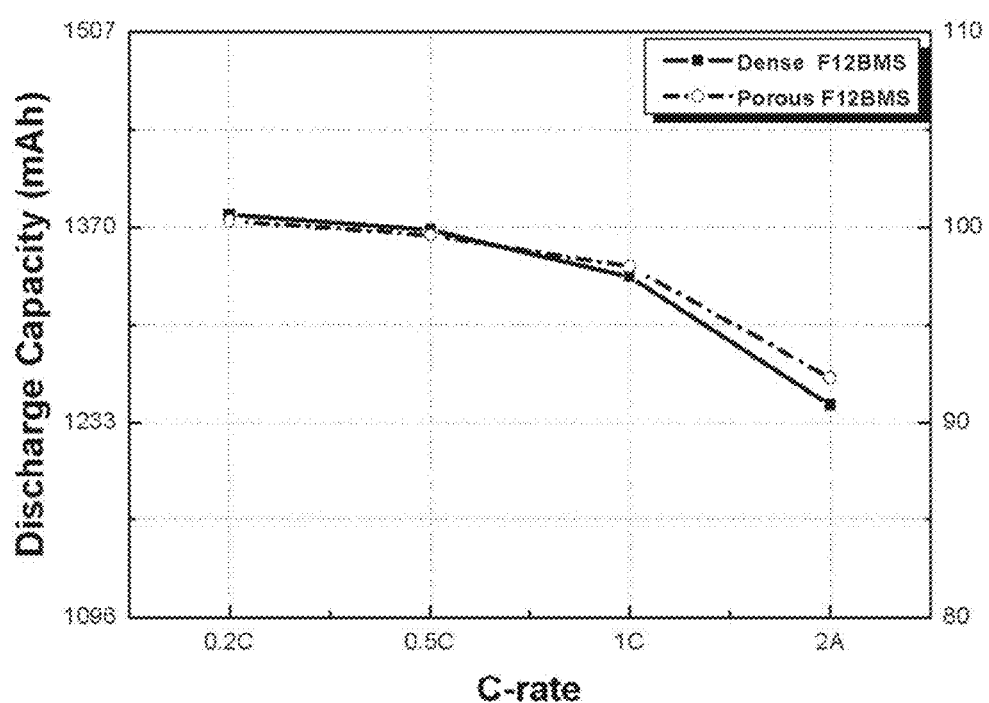
FIG. 5 is a graph showing the discharge characteristics of the battery using the separator comprising the dense gel polymer layer formed in Comparative Example 1 and those of the battery using the separator comprising the gel polymer layer with an open porous structure formed in Example 1.

The following test was performed to evaluate the high-rate discharge characteristics and cycle characteristics of the lithium secondary battery comprising the separator according to the present invention.
3-1. Evaluation of C-Rate Characteristics Each of the batteries of Example 1 and Comparative Example 1 having a capacity of 1350 mAh under 1 C was subjected to cycling at a charge current of 0.5 C and a discharge rate of 0.2 C, 0.5 C, 1 C and 2 A. FIG. 5 shows the discharge capacity of each battery, the capacity being expressed on the basis of C-rate characteristics.

After the test, the lithium secondary battery according to Comparative Example 1 shows a drop in the capacity as a function of discharge rate as compared to the battery according to Example 1. This indicates that lithium ion conduction is inhibited in the battery due to the resistance of the dense gel polymer layer formed on the separator. Such inhibition increases as the discharge rate increases. On the contrary, the lithium secondary battery using the separator according to the present invention shows excellent C-rate characteristics as demonstrated by the absence of any significant drop in the discharge characteristics to a discharge rate of 2 A. It is thought that such excellent C-rate characteristics result from the three-dimensional porous structural morphology.
3-2. Evaluation of Cycle Characteristics Each of the lithium secondary batteries according to Examples 1 and Comparative Example 1 was subjected to 400 charge/discharge cycles at a temperature of 23° C. under a current of 1 C in a voltage range of 4.2~3V.

Figure 6:
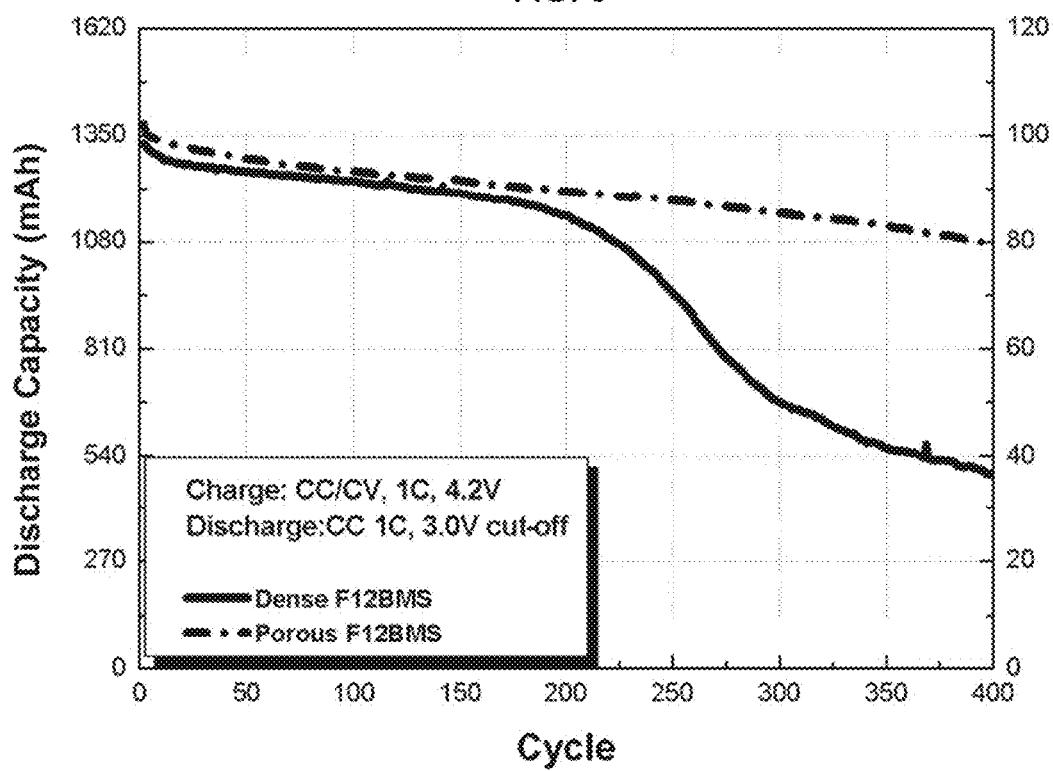
FIG. 6 is a graph showing the lifetime characteristics of the battery using the separator comprising the dense gel polymer layer formed in Comparative Example 1 and those of the battery using the separator comprising the gel polymer layer with an open porous structure formed in Example 1.

As shown in FIG. 6, the lithium secondary battery using the separator having an open porous gel polymer layer according to Example 1 shows at least 80% of the initial battery efficiency, even after 400 cycles. However, the lithium secondary battery using the separator having the dense gel polymer layer according to Comparative Example 1 shows a rapid drop in the capacity from the $200^{th}$ cycle, and retains only about 40% of the initial capacity after 400 cycles.

Therefore, it can be seen from the above results that the electrochemical device using the gel polymer separator according to the present invention has excellent lifetime characteristics.

INDUSTRIAL APPLICABILITY

As can be seen from the foregoing, when applying the separator having the gel polymer layer including a plurality of interconnected three-dimensional open pores on a substrate according to the present invention to a battery, it is possible to improve the degree of swelling with an electrolyte and to increase the holding amount and injection amount of an electrolyte, and thus to provide an electrochemical device with improved quality including cycle characteristics and high-rate discharge characteristics.

What is claimed is:

1. A method for preparing a separator for a battery with a gel polymer layer on a substrate, wherein the gel polymer layer includes a plurality of three-dimensional open pores interconnected with each other, the method comprising the steps of:
   applying a solution onto a substrate, wherein the solution contains a polymer dissolved in a solvent, wherein the polymer is capable of forming a gel; and
   applying an atomized non-solvent to the solution during a step of heating the solution on the substrate to cause phase separation in the solution to form a plurality of three-dimensional open pores in a gel polymer layer, wherein the atomized non-solvent is a non-solvent for the polymer.

2. The method as claimed in claim 1, wherein the heating of the solution is performed at a temperature of 50-130° C.

3. The method as claimed in claim 1, wherein the polymer has a solubility parameter of 15-45 $MPa^{1/2}$.

4. The method as claimed in claim 1, wherein the polymer has a weight average molecular weight of 10,000-1,000,000 g/mol.

5. The method as claimed in claim 1, wherein the solvent used for dissolving the polymer is acetone, tetrahydrofuran, methylene chloride, chloroform, dimethyl formamide, N-methyl-2-pyrrolidone, cyclohexane or a mixture thereof.

6. The method as claimed in claim 1, wherein the non-solvent is selected from alcohols, water and mixtures thereof.

7. The method as claimed in claim 1, wherein a concentration of the polymer ranges from 0.1-30 wt %, relative to the total weight of the solution.

8. The method as claimed in claim 1, wherein a volume ratio of the non-solvent to the solvent is used ranges from 0.1-50.

9. The method as claimed in claim 1, wherein the pores have an average diameter of 0.01-10 μm.

10. The method as claimed in claim 1, wherein the substrate has a thickness of 1-100 μm and the gel polymer layer has a thickness of 0.1-10 μm.

* * * * *